US006221407B1

(12) United States Patent
Gallart et al.

(10) Patent No.: US 6,221,407 B1
(45) Date of Patent: *Apr. 24, 2001

(54) CONFECTIONARY PRODUCT INCLUDING COMPARTMENT FOR HOUSING AN OBJECT

(75) Inventors: Ramón Escolà Gallart; Ramón Bayés Turull, both of Barcelona (ES)

(73) Assignee: Zeta Espacial, S.A. (ES)

( * ) Notice: Subject to any disclaimer, the term of this patent is extended or adjusted under 35 U.S.C. 154(b) by 0 days.

This patent is subject to a terminal disclaimer.

(21) Appl. No.: 08/931,795

(22) Filed: Sep. 16, 1997

(30) Foreign Application Priority Data

Feb. 21, 1997 (DE) .......................................... 297 03 131 U (51) Int. Cl.⁷ .............................. B65D 85/60; A23G 3/00
(52) U.S. Cl. ............................. 426/91; 426/90; 426/104; 426/110; 426/115; 426/120; 426/103; 426/134
(58) Field of Search ..................................... 426/104, 112, 426/115, 130, 134, 91, 110, 120, 90, 103; 401/52, 195; 132/318; 206/216

(56) References Cited

U.S. PATENT DOCUMENTS

| D. 359,607 | * | 6/1995 | Yurl | 426/115 |
|---|---|---|---|---|
| 1,593,858 | * | 7/1926 | Venable | 426/134 |
| 1,847,415 | * | 3/1932 | Snell | 426/134 |
| 2,096,611 | * | 10/1937 | Ellestad | 426/134 |
| 2,151,282 | * | 3/1939 | Stamp | 426/134 |
| 2,156,482 | * | 5/1939 | Roob | 426/104 |
| 2,190,231 | * | 2/1940 | Craddock | 426/104 |
| 2,402,072 | * | 6/1946 | Nehrke | 132/318 |
| 2,626,847 | * | 1/1953 | Brown | 401/52 |
| 2,698,802 | * | 1/1955 | Boon | 426/104 |
| 2,728,932 | * | 1/1956 | Ramsey, Sr. | 401/52 |
| 2,834,685 | * | 5/1958 | Ferguson | 426/134 |
| 2,963,147 | | 12/1960 | Stagner | 206/46 |

(List continued on next page.)

FOREIGN PATENT DOCUMENTS

| 4141727 | * | 7/1993 | (DE) | 426/134 |
|---|---|---|---|---|
| 295 11 712 U | | 11/1995 | (DE) . | |
| 296 07 116 U | | 9/1996 | (DE) . | |
| 0178188 | | 4/1986 | (EP) . | |
| 1008335 | | 5/1981 | (FR) . | |
| 262005 | | 12/1926 | (GB) . | |
| 1362764 | * | 8/1974 | (GB) | 426/134 |
| 2093433 | * | 9/1982 | (GB) | 426/134 |
| 62-36151 | * | 2/1987 | (JP) | 426/104 |
| 62-220150 | * | 9/1987 | (JP) | 426/104 |
| 76242 | * | 2/1950 | (NO) | 132/318 |
| 100783 | * | 5/1994 | (PT) | 426/104 |

OTHER PUBLICATIONS

Topps Co. Pamphlet, Topps. Co., Brooklyn Tn.Y. Dec. 1993.*

The Confectioner 77(1–2) May 1992, p. 14 (Dialog Abstract).*

*Primary Examiner*—Steven L. Weinstein
(74) *Attorney, Agent, or Firm*—Steinberg & Raskin, P.C.

(57) ABSTRACT

A confectionary product including a substantially transparent candy mass and a substantially cylindrical housing for supporting and retaining the candy mass and including an interior compartment for storing a small object. The housing includes a cylindrical base having a tubular wall defining an interior compartment and an opening leading to the interior compartment, a cap removably engaging with the base and enclosing the candy mass when in engagement with the base, and a sealing member for closing the opening of the base to thereby seal the interior compartment of the base. The object in the interior compartment is accessible by removing the sealing member from engagement with the base. The candy product or mass may have a plurality of different tastes and/or a plurality of different colors.

16 Claims, 5 Drawing Sheets

U.S. PATENT DOCUMENTS

| | | | |
|---|---|---|---|
| 2,980,039 | * | 4/1961 | Jolly ................................. 426/134 |
| 3,138,249 | * | 6/1964 | Pavlini ............................. 426/104 |
| 3,706,354 | | 12/1972 | Gruska ............................. 401/78 |
| 4,023,912 | * | 5/1977 | Maher et al. ..................... 426/115 |
| 4,794,008 | * | 12/1988 | Schmidt et al. .................. 426/130 |
| 4,914,748 | * | 4/1990 | Schlotter et al. ................. 426/104 |
| 4,992,283 | * | 2/1991 | Shorey ............................. 426/104 |
| 5,007,756 | * | 4/1991 | Wey ................................. 401/52 |
| 5,009,535 | * | 4/1991 | Ohar ................................. 401/195 |
| 5,066,502 | * | 11/1991 | Eales ............................... 426/134 |
| 5,273,528 | * | 12/1993 | Skeen et al. ..................... 401/195 |
| 5,302,403 | * | 4/1994 | Cook et al. ...................... 426/134 |
| 5,370,219 | * | 12/1994 | Violett ............................. 426/115 |
| 5,531,318 | * | 7/1996 | Coleman et al. ................. 426/115 |
| 5,549,405 | * | 8/1996 | Krahn ............................... 401/52 |

* cited by examiner

CONFECTIONARY PRODUCT INCLUDING COMPARTMENT FOR HOUSING AN OBJECT

FIELD OF THE INVENTION

The present invention relates to a hand-held confectionary product having a solid, transparent candy mass and a housing therefor including an interior compartment receivable of an object of interest to the intended purchasers of the confection, e.g., a small toy of interest to children. By licking the candy mass, which thus slowly dissolves, the child receives a pleasurable taste. More particularly, the housing is substantially cylindrical and includes a plastic base having a hollow interior compartment accessible at one end of the base for housing the toy and a support and retaining structure for the candy mass at an opposite end of the base, a transparent or opaque cap or cover removably engaging with the base to enclose the candy mass without contact between the cover and the candy mass and a sealing member removably engaging with the base to seal the hollow interior compartment. The cover may be transparent or opaque, possibly includes printed matter thereon, and/or may have the shape of a (well-known) character. The candy mass may be a solid product formed upon solidification of a liquid candy or confectionary material that may have different colors and various flavors. The candy mass is a confectionary product that the child is consuming just the time he or she wishes to "eat" the product, and then he or she is able to place the cover on the product to keep the product clean. The shape of the candy mass may be cylindrical or conical, or it can have any other geometrical shape or even the shape of a (well-known) character.

BACKGROUND OF THE INVENTION

In the prior art, there are several hand-held confectionary products having a solid candy product that dissolves upon being licked by the tongue of the consumer thereby imparting a pleasurable taste to the consumer.

One particular confectionary product of interest is a candy called a PUSH POP™, distributed by, e.g., Topps Ireland. This product has a two-part detachable housing, i.e., a base member onto which a candy mass is mounted and an opaque cap or cover removably engaging with the base for covering the candy mass. The candy mass is solid and mounted on a displaceable member for movement from a storage position in which it is situated substantially within the base to a consumption position in which it extends beyond the base a desired distance as needed for licking by the consumer, the desired distance being determined by the consumer, but it is most often the extreme extended position. The sliding member is moved by inserting a finger of the consumer through an aperture in the bottom of the base to engage with the sliding member. Accordingly, the sliding member must be accessible through the bottom of the base. The cap has a flat upper surface and in light of its opacity, prevents viewing of the candy mass when engaging with the base. A thin, elongate clip is attached to the cap and extends over the base and enables the confectionary product to be attached to, e.g., clothing.

It is a problem with the PUSH POP™ that as the candy mass dissolves, i.e., as it is being licked, some of the dissolved candy may drip onto the sliding member and prevent movement of the sliding member. Also, the continual movement of the candy mass into and out of the base is detrimental to the cleanliness of the candy product, and will make the product less attractive from the commercial standpoint because it causes the child to get dirty or sticky fingers.

Another very significant problem of the prior art confectionary product is that the solid candy bar sticks to the wall of the plastic container during its storage in a warehouse. In spite of the fact that it is provided with a wrapper, the candy gives off moisture, sticks to the plastic walls of the cap and thereby makes consumption of the candy bar nearly impossible. The child is not aware of such deterioration upon purchasing the confectionary product, and will be highly disappointed when after unwrapping the candy, he cannot get it out of the housing.

Other confectionary products similar to the PUSH POP™ include a KISSING™ candy manufactured by Jeong Woo Confectionery Co., Ltd., Korea and a TORPEDO™ candy. Also manufactured in Korea. This product is essentially identical to the PUSH POP™ except that it has a rounded cap and the clip extends further along the base. Nevertheless, the same problems prevalent in the PUSH POP™ are also present in this confectionary product.

OBJECTS AND SUMMARY OF THE INVENTION

It is an object of the present invention to provide a new confectionary product in which a solid candy mass is supported and retained in a holder or base which includes an accessible, interior compartment in which a small object such as a toy can be placed.

It is another object of the present invention to provide a new and improved confectionary product which is more pleasing and attractive to the primary intended consumers of the same, i.e., children.

It is yet another object of the invention to provide a hand-held confectionary product which does not have the disadvantages of prior art confectionary products, namely the PUSH POP™, KISSING™ and TORPEDO™ products, in particular, which avoids sticking of the candy to the plastic walls of the cap so that the child will not get dirty or sticky fingers.

It is still another object of the present invention to provide a new and improved housing for a confectionary product which enables viewing of the contents of the confectionary product situated within the housing without requiring the housing to be opened.

To obtain these objects and others, the confectionary product in accordance with the invention generally comprises a substantially cylindrical housing having an accessible interior compartment and a transparent candy mass supported by the housing. In one basic embodiment, the housing is made of plastic and comprises a base and a cap removably engaging with the base for covering the candy mass. The base has a support and retaining structure at one end thereof, such as a projection extending from a planar surface, connected to the candy mass to firmly retain the candy mass. A sealing member or plastic tap removably engages with an open end of the base to close an opening leading into the interior compartment and thus seals the interior compartment. A small toy of interest to a child may at least initially be placed in the compartment, e.g., for sales purposes. The cap is preferably transparent to enable viewing of the candy mass while engaging with the base and covering the candy mass. The candy mass is preferably a solid, transparent mass having one or more colors and one or more flavors formed by the solidification of a liquid material while the projection on the base is immersed therein to enable the projection to be firmly embedded in the solid candy mass. Adherence increasing means are provided on the projection, such as outwardly extending ridges or indented grooves, in order to increase the adherence and bonding of the candy mass to the projection. The transparent candy mass may have several different colors and/or several different tastes selected to appeal to children.

In certain embodiments, the base comprises a tubular wall and a transverse wall extending across one end of the tubular wall. The projection is arranged on and projects upward from the transverse wall. The projection may comprises a tubular wall having a rounded top extending from an upper edge thereof or, in the alternative, a tubular wall having a flat transverse wall extending from an upper edge thereof.

BRIEF DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE PREFERRED EMBODIMENTS

Figure 1:
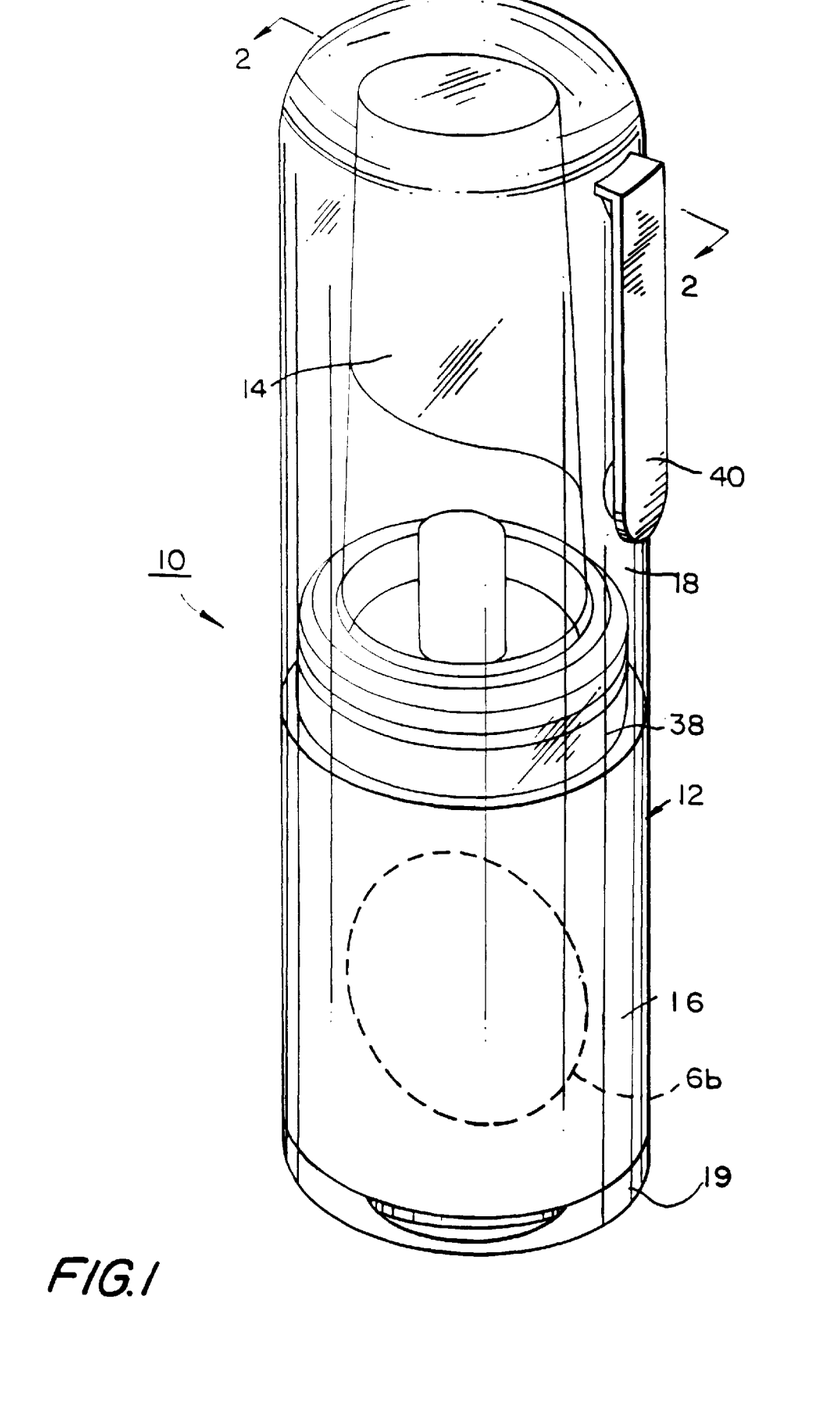
FIG. 1 is a perspective view of a confectionary product in accordance with the invention.

Referring to the accompanying drawings wherein like reference characters designate identical or corresponding parts throughout the several views, FIG. 1 shows a confectionery product 10 in accordance with the invention which comprises a substantially cylindrical housing 12, and a solid candy mass 14 supported and retained in the housing 12. The housing 12 includes a substantially cylindrical base 16, a transparent, substantially cylindrical cap 18 removably engaging with the base 16 to cover the candy mass 14 when the candy mass 14 is not being consumed and a sealing member 19 removably engaging with the base 16. The candy mass 14 is arranged at one end of the base 16 while the sealing member 19 is arranged at an opposite end. The base 16, cap 18 and sealing member 19 may be formed of plastic. The base 16 is formed by a tubular wall 20 defining a hollow, interior compartment 22 and an integral transverse upper wall 24 closing an upper end of the tubular wall 20. The base 16 also includes an opening 26 for accessing the interior compartment 22 arranged to extend across substantially the entire lower end of the tubular wall 20. A projection 28 extends upwardly from a central region of the transverse upper wall 24 and is fixedly connected to the solid candy mass 14. More specifically, at least a portion of the projection 28 including its upper end 30 is embedded within a lower region 32 of the candy mass 14 during fabrication of the confectionary product 10. To obtain the fixed connection between the candy mass 14 and the projection 28, and thus the base 16, the projection 28 may be inserted at least partially into a mold in which the candy mass 14 is situated while in a liquid form so that upon solidification, the candy mass 14 is tightly secured and firmly embedded onto the projection 28. In this manner, the candy mass 14 does not move relative to the base 16 and therefore, the problems associated with movement of a candy mass relative to a supporting member, as in the prior art confectionary products mentioned above, are avoided.

Figure 4:
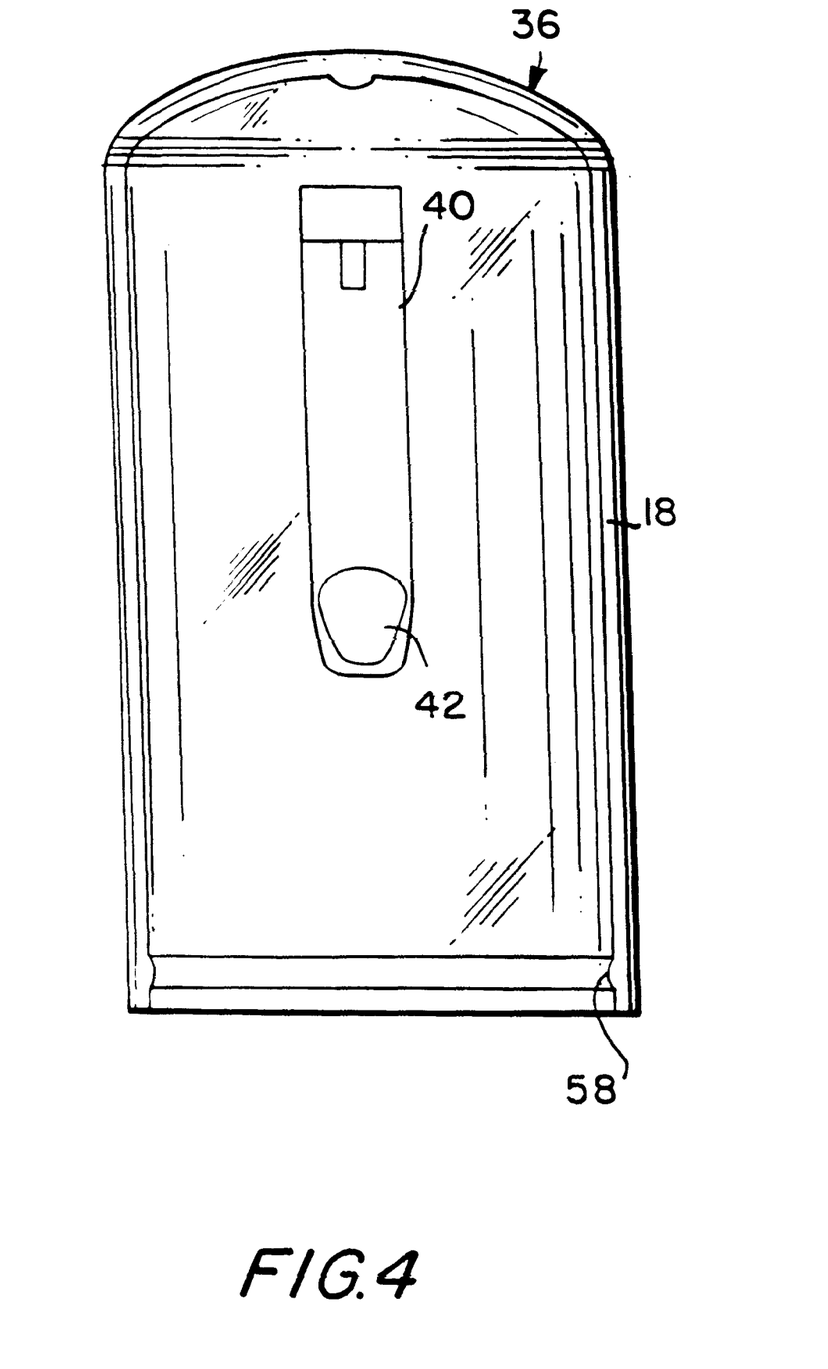
FIG. 4 is a view of the cap for the confectionary product shown in FIG. 1.

The transparent cap 18 includes a tubular wall 34 and dome-shaped top 36 adjoining an upper end of the tubular wall 34. The cap 18 is preferably made of a suitable plastic which can provide both rigidity and transparency. The cap 18 is dimensioned to overlie the candy mass 14 with a sufficient clearance between the inner surface of the cap 18 and the candy mass 14 to prevent contact therebetween, and thus prevent sticking of the candy mass 14 to the cap 18 during warehousing and upon its consumption (dissolution) which would lead to difficulty in separating the cap 18 from the base 16 for subsequent consumption. The lower end of the cap 18 is designed to fit around a circular rim 38 of the tubular wall 20 of the base 16. Rim 38 extends upward above the transverse wall 24 to thereby define a recessed region. Instead of the rounded top 36, the cap 18 may have a substantially planar top surface adjoining the upper end of the tubular wall 34. The cap 18 includes attachment means such as an elongate clip 40 which enables the confectionary product 10 to be attached to, e.g., a child's shirt pocket. The clip 40 extends from an area at the junction between the tubular wall 34 and the dome-shaped top 36 downward along the outer surface of the tubular wall 34 but does not extend beyond the tubular wall 34 or overlie the base 16. The clip 40 includes a small protuberance 42 on a side facing the cap 18 to prevent the confectionary product 10 from falling when, e.g., attached to the child's shirt pocket. Alternatively, the base 16, cap 18 or clip 40 can be provided with an orifice and a closed string passing through the orifice, in which case, the child can hang the confectionary product 10, e.g., around his or her neck.

The candy mass 14 is substantially elongate and tapers in a direction from its lower region 32 mounted onto the projection 28 to its upper region 44. The candy mass 14 is made from an edible confectionary material and can be provided with a single color and multiple tastes, or multiple colors each having a different tastes, or multiple colors and a single taste, so that a variety of different flavors appealing to the child's taste and appearances appealing to the child's eyes are possible. The incorporation of the color and taste into the confectionary material that will form the candy mass 14 may be performed by any known flavoring and coloring process in the art.

As shown in FIG. 1, the projection 28, also referred to as a plastic pivot, is substantially cylindrical and is defined by a tubular wall 46 and a dome-shaped top portion 48 adjoining the tubular wall 46. A central axis of the projection 28 is preferably substantially coaxial with the central axis of the base 16 and preferably should also be coaxial with the central axis of the candy mass 14. The projection 28 may be viewed through the candy mass 14 in view of the partial transparency of the candy mass 14.

Figures 2, 2A:
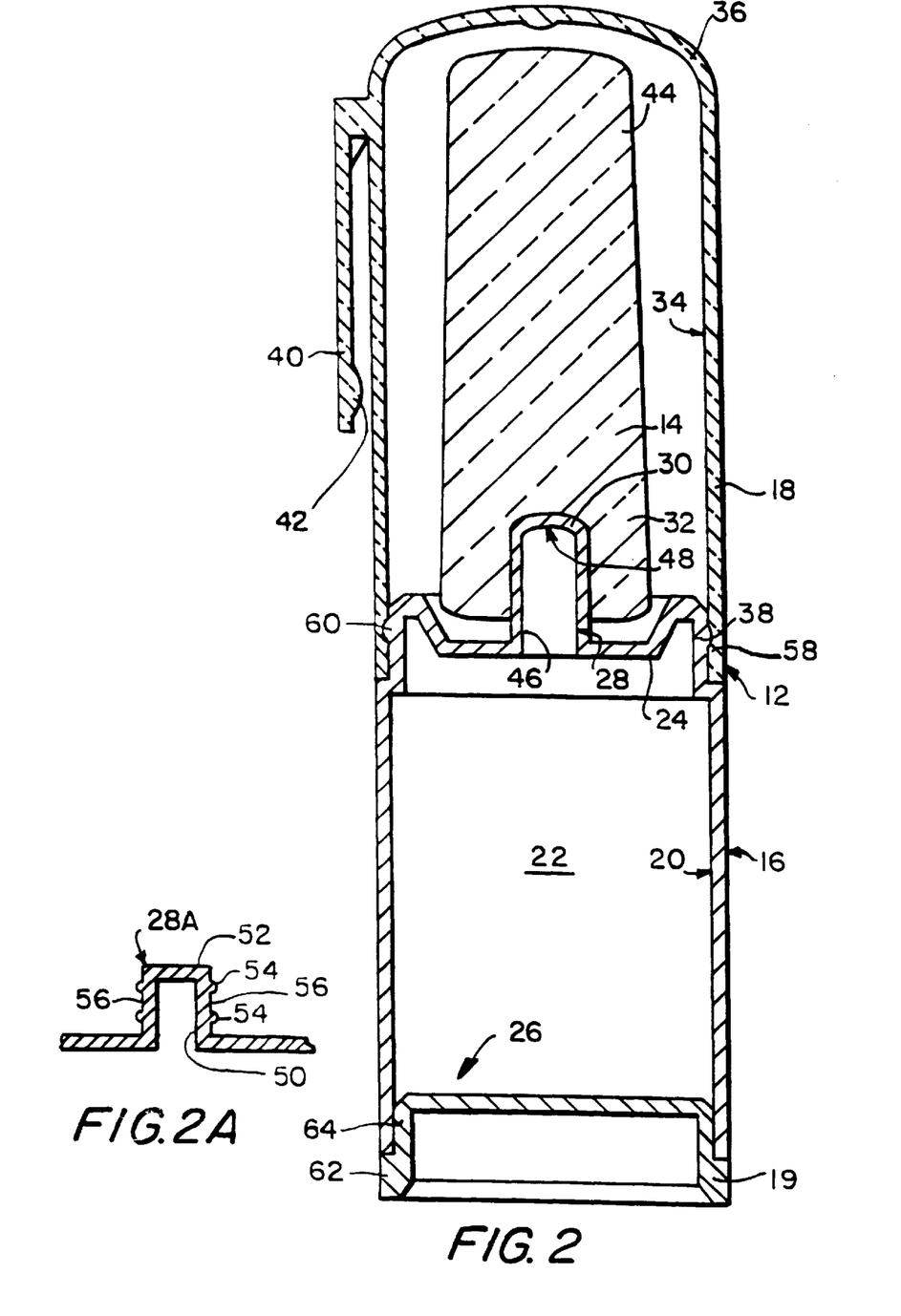
FIG. 2 is a cross-sectional view of the confectionary product shown in FIG. 1 taken along the line 2—2.
FIG. 2A is a view of an alternative construction of the projection on the base of the confectionary product shown in FIGS. 1 and 2.

FIG. 2A shows an alternative projection 28A which is substantially cylindrical and is defined by a tubular wall 50 and a flat upper transverse wall 52. The outer surface of the tubular wall 50 of the projection 28A is provided with several ridges 54 in order to enhance the connection between the projection 28A and the candy mass 14, i.e., increase the adherence of the candy mass 14 to the projection 28A, and achieve a firm embedding of the lower region 32 of the candy mass 14 onto the base 16. Also, grooves 56 may be provided on the projection 28A for this purpose, i.e., so that a portion of the candy mass 14 is present in these grooves and serves to maintain the candy mass 14 in connection with the base 16. Such ridges and/or grooves may also be provided on the projection 28 shown in FIG. 1. Also, the projection 28 may have configurations other than the rounded, cylindrical form shown in FIG. 1 and the flat-topped, cylindrical form shown in FIG. 2, such as a conical form, cylindrical form having a rounded head different from that shown in FIG. 1 or a cylindrical form with a hollow cavity. All of these forms and configurations are constructed so as to enhance and improve the bonding between the projection 28 and the candy mass 14, and to this end, should include at least one ridge and/or groove.

The projection 28 may be hollow, extend into the candy mass 14 over a significant axial length thereof, i.e., more than shown in the illustrated embodiments, have thinner walls and/or a flat top. Also, instead of a single projection 28, there may be a plurality of projections 28 arranged in connection with the transverse upper wall 24, such as small protuberances, and the solid, transparent candy mass 14 would be retained by these protuberances instead of at the upper end 30 of the projection 28.

Thus, it will be appreciated that the candy mass 14 is firmly fixed to the base 16 which is held by the consumer without any sliding or moving parts. This firm, fixed attachment enables the cap 18 to be removed from engagement with the base 16 without problems of the cap 18 adhering to the base 16, as occurs in the prior art candy products mentioned above which entail movement of the candy mass within the base.

In order to attach the cap 18 to the rim 38, a ridge 58 is provided on an interior surface of the cap 18 at a lower region thereof Ridge 58 is designed to cooperate with projection 60 on a side face of the rim 38 of the base 16 to securely, yet removably connect the cap 18 to the base 16. Thus, when in the connection position, the ridge 58 is situated below the projection 60 to prevent the cap 18 from falling off the base 16 if the candy is turned over. However, by applying pressure to the cap 18 and/or base 16, i.e., pulling the cap 18 and/or the base 16 away from the other, it is easy to separate the cap 18 from the base 16 and thereby enable access to the candy product 14 retained on the base 16. Other cooperating fastening means for providing a secure yet removable engagement between the cap 18 and the base 16 can of course be provided.

Figures 5, 6:
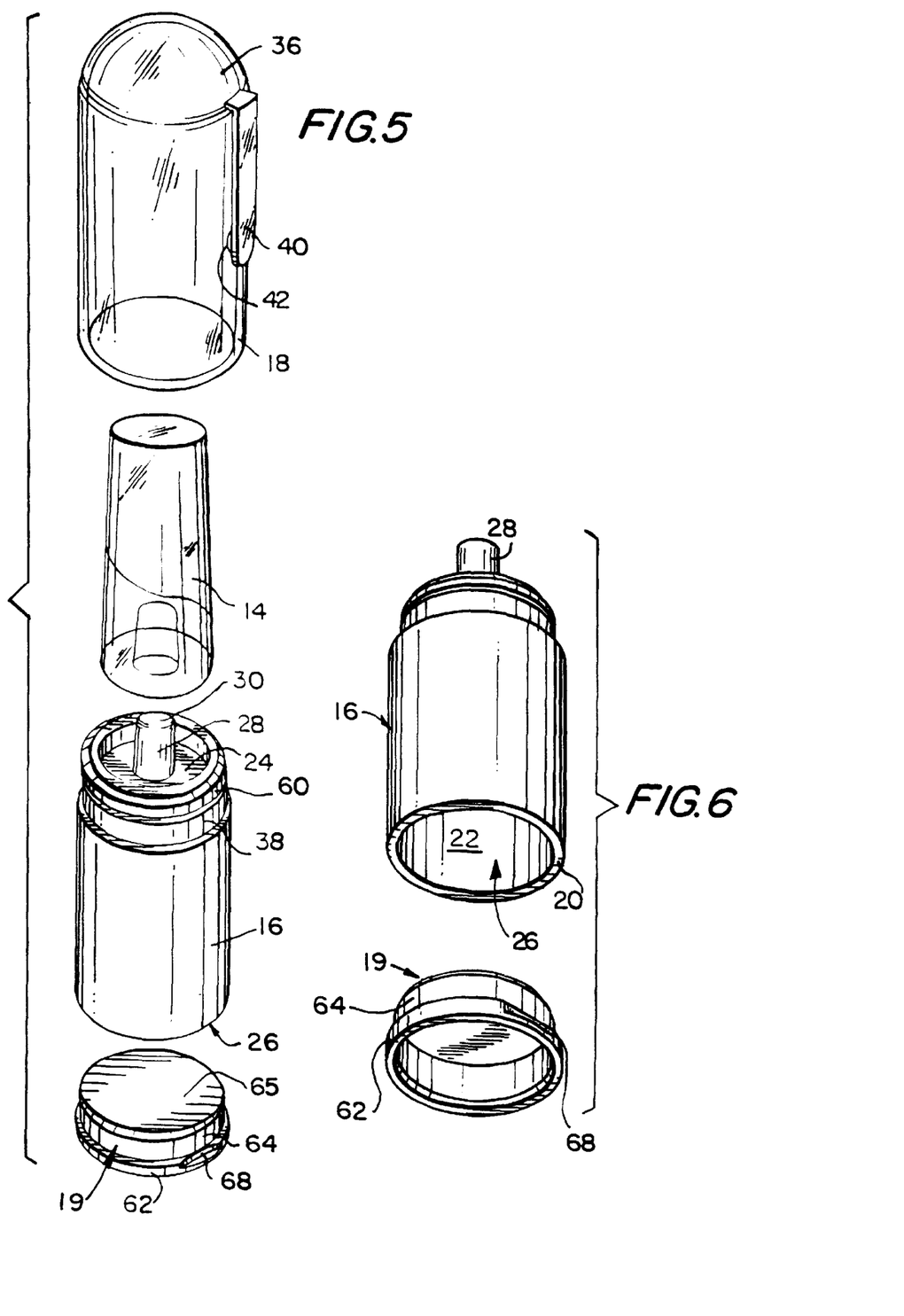
FIG. 5 is a top, exploded view of the confectionary product shown in FIG. 1.
FIG. 6 is a bottom, exploded view of the base of the confectionary product shown in FIG. 1

The sealing member or tap 19 is removably attached to the lower end of the tubular wall 20 of the base 16. The sealing member 19 is designed to be at least partially insertable into the opening 26 in the base 16 in order to seal the interior compartment 22 of the base 16. The sealing member 19 is substantially circular and includes a base section 62 having an outer surface with a diameter substantially equal to the diameter of the outer surface of the wall 20 of the base 16 and a narrow section 64 having an outer surface with a diameter substantially equal to the diameter of the inner surface of the wall 20 of the base 16. A transverse wall 65 extends across the upper edge of the narrow section 64 of the sealing member 19 (FIG. 5). The sealing member 19 is thus able to fit tightly within the opening 26 (frictionally engaged therewith) and remain there in the absence of a pressure being applied to remove it. In this manner, a small object such as a toy or ball 66 (shown in dotted lines in FIG. 1), which may constitute a "prize" for a child, may be stored within the compartment 22 of the base 16, e.g., as an added purchasing benefit. Further, once the candy mass 14 has been consumed, the base 16 having the sealable interior compartment 22 may be retained by the child and used to store money or other special items. To provide easy detachment of the sealing member 19 from the base 16, the sealing member 19 includes a lens-shaped indentation 68 in the base section 62. Other cooperating means to detachably close the compartment may also be used without deviating from the scope and spirit of the invention.

The sealing member 19 may be provided with a small aperture in order to avoid any over-pressure inside the hollow compartment 22 when closing the compartment 22 with the sealing member 19. Such an over-pressure could cause the sealing member 19 to remain poorly closed or only partially closed.

Figure 3:
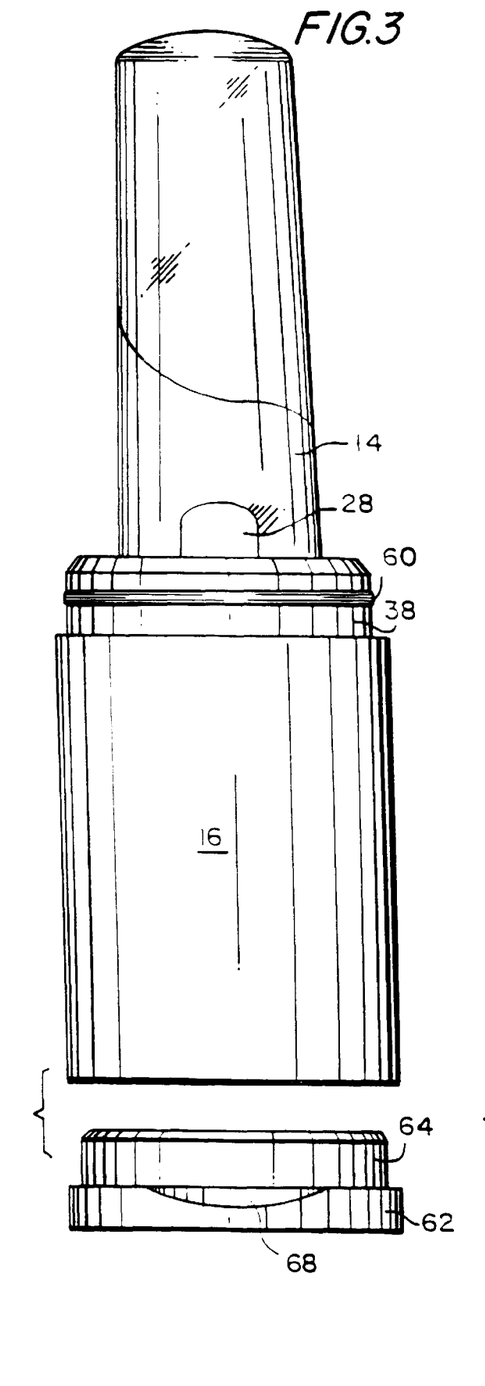
FIG. 3 is a partially exploded view of the confectionary product shown in FIG. 1 with the cap removed and the sealing member separated from the base.
Figure 3A:
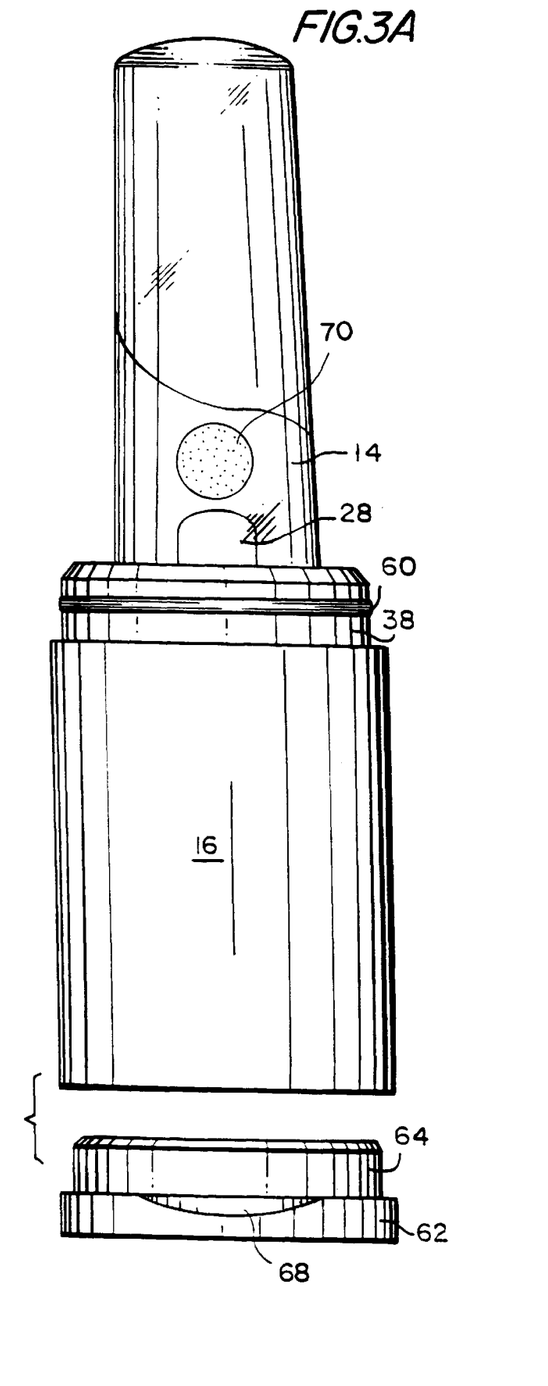
FIG. 3A is a partially exploded view of another embodiment of the confectionary product shown in FIG. 1 with the cap removed and the sealing member separated from the base.

The candy mass 14 is preferably a solid, transparent mass having a cylindrical or conical form. The candy mass or product may be produced having a single taste and in a single color or a plurality of different colors, i.e., either in different portions of the candy mass of interspersed throughout. In addition to or instead of different colors, the candy mass may be provided with different tastes, i.e., different portions of the candy mass have a distinct taste. The selection of the different tastes and/or different colors may be determined based on the appeal to the intended consumers. The candy mass 14 may also have different shapes such as the shape of a particular character, person or animal. As shown in FIG. 3A, the transparent candy mass 14 may also contain one or more pieces of bubble gum 70 or small candy balls of a different confectionary material, suspended inside the candy bar.

With respect to the dimensions of the housing 12, in a preferred embodiment of the invention, the base 16 has a height between about 5 mm and about 150 mm and a diameter between about 5 mm and about 60 mm. The cap 18 has a height between about 5 mm and about 150 mm and a diameter between abut 5 mm and about 60 mm. In total, the height of the housing 12 is from about 20 mm to about 165 mm and the diameter of the housing 12 is from about 5 mm to about 55 mm.

The examples provided above are not meant to be exclusive. Many other variations of the present invention would be obvious to those skilled in the art, and are contemplated to be within the scope of the appended claims. In addition, in certain embodiments, the candy mass 14 does not necessarily have a cylindrical shape. Although a cylindrical form, i.e., a circular cross-section, is the illustrated embodiment, the confectionary product may also have other product configurations and geometric shapes without deviating from the scope and spirit of the invention.

We claim:

1. A confectionary product comprising an edible, substantially transparent candy mass, and a substantially cylindrical housing for supporting and retaining said candy mass, said housing comprising a substantially hand holdable cylindrical base having support and retaining means at a first end of said base for supporting and retaining said candy mass, an interior compartment within said base, an opposed second end of said base having an opening leading to said interior compartment, a cap removably engaging with said base at said first end, said cap being structured and arranged to enclose said candy mass when said cap is in engagement with said base, and a sealing member removably engaging with said base for closing said opening at said second end of said base to thereby seal said interior compartment of said base;

such that an article placed within said interior compartment is accessible through said second end of said base while said candy mass is simultaneously supported at said first end of said base.

2. The confectionary product of claim 1, wherein said base comprises a tubular wall and a transverse wall extending across an end of said tubular wall defining said first end of said base, said support and retaining means comprising a projection arranged on and projecting upward from said transverse wall, said candy mass being attached to said projection, said sealing member removably engaging with said tubular wall.

3. The confectionary product of claim 2, wherein said projection comprises a tubular wall having a rounded top extending from an upper edge of said tubular wall.

4. The confectionary product of claim 2, wherein said projection comprises a tubular wall having a flat transverse wall extending from an upper edge of said tubular wall.

5. The confectionary product of claim 4, wherein said projection comprises means for increasing the adherence of said candy mass to said projection, said adherence increasing means comprising at least one groove formed in an outer surface of said projection into which a portion of said candy mass is situated or at least one outwardly projecting ridge formed on an outer surface of said projection around which said candy mass is situated.

6. The confectionary product of claim 1, wherein said cap is made of a rigid, transparent plastic material to enable viewing of said candy mass through said cap when said cap is in engagement with said base.

7. The confectionary product of claim 1, wherein said opening at said second end of said base is defined by an inner, cylindrical surface of said base, said sealing member having a substantially cylindrical base section having a diameter substantially equal to the diameter of an outer surface of said base and a substantially cylindrical upper section having a diameter substantially equal to the diameter of said inner surface of said base such that said upper section is insertable into said opening at said second end of said base to frictionally engage with said inner surface of said base.

8. The confectionary product of claim 7, wherein said base section of said sealing member includes a lens-shaped indentation to facilitate detachment of said sealing member from said base.

9. The confectionary product of claim 1, wherein said cap includes attachment means for enabling attachment of the confectionary product to another article, said attachment means comprising a clip projecting outwardly from said cap.

10. The confectionary product of claim 1, wherein said cap and said base include cooperating attachment means for removably attaching said cap to said base.

11. The confectionary product of claim 10, wherein said base and said cap have a substantially circular cross-section, said cap having an inner surface and said base having an upraised, circular rim at said first end, said cooperating attachment means comprising a ridge arranged on said inner surface of said cap and a projection arranged on said rim of said base, said ridge and said projection being structured and arranged such that said ridge passes over said projection when said cap is secured to said base.

12. The confectionary product of claim 1, further comprising a small toy situated in said interior compartment of said base said base being structured and arranged such that said toy is removable from said interior compartment while said candy mass is supported and retained by said housing.

13. The confectionary product of claim 1, wherein said candy mass has at least one of a plurality of different tastes and a plurality of different colors.

14. The confectionary product of claim 1, wherein said candy mass is fixedly connected to said base.

15. The confectionary product of claim 1, wherein said housing is made of plastic.

16. The confectionary product of claim 1, wherein said candy mass includes one or more pieces of bubble gum.

* * * * *